A. HAYES.
APPARATUS FOR FORMING A LIQUID FUEL.
APPLICATION FILED JUNE 5, 1919.
1,416,291. Patented May 16, 1922.
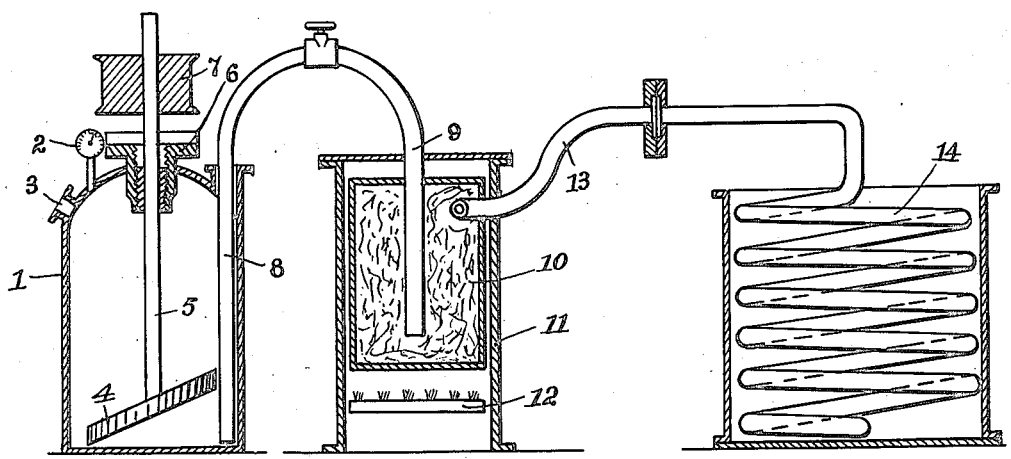

UNITED STATES PATENT OFFICE.

ALBERT HAYES, OF NEW YORK, N. Y., ASSIGNOR, BY MESNE ASSIGNMENTS, TO U. S. INDUSTRIAL ALCOHOL CO., A CORPORATION OF WEST VIRGINIA.

APPARATUS FOR FORMING A LIQUID FUEL.

1,416,291.     Specification of Letters Patent.     Patented May 16, 1922.

Application filed June 5, 1919. Serial No. 302,065.

*To all whom it may concern:*

Be it known that I, ALBERT HAYES, a citizen of the United States, residing at New York, in the county of New York, State of New York, have invented certain new and useful Improvements in Apparatus for Forming a Liquid Fuel, of which the following is a description, reference being had to the accompanying drawings, forming a part hereof.

My invention relates to apparatus for forming a liquid fuel for use in explosion engines and for other purposes and has for its object to produce an apparatus which will be simple in construction, relatively inexpensive in construction and operation and will be effective to produce from ingredients of relatively low cost, a liquid fuel which will be of a permanent character adapted for being safely stored and transported and will be readily vaporized in an ordinary carburetor to form an explosive mixture adapted for explosion engine use.

With these and other objects hereinafter more fully explained in view my invention consists in the apparatus hereinafter described and claimed.

The drawing shows in diagrammatic form and partly in section, an apparatus embodying my invention.

In the drawing 1 indicates a tank in which is placed a mixture of the ingredients from which the liquid fuel is to be made, this mixture preferably consisting of a relatively heavy hydrocarbon oil of high flash point, alcohol, preferably wood alcohol, and relatively light hydrocarbon oils of very low flash point, the heavy hydrocarbon oil and the alcohol being the principal ingredients. This tank is adapted to sustain a considerable air pressure and is provided with a pressure gage 2, and an inlet 3 for introducing the mixture, and also for supplying the air under pressure, and within the tank is arranged an agitator 4 carried by a shaft 5 extending through a suitable gland 6 and having a pulley 7 on its outer end.

A pipe 8 leads from near the bottom of the tank to a pipe 9 which extends downward into a vertically arranged catalytic chamber 10, and terminates near the bottom of the catalytic chamber so as to discharge the mixture into the lower end thereof. This chamber is filled with a mixture of fragments of burned clay rich in aluminum, and which may be the so called fire brick or may be ordinary brick, and relatively small pieces of metallic zinc and nickel, the zinc and nickel being well distributed among the fragments of burned clay. This catalyst is arranged to be heated by a burner 12 and is enclosed in a casing 11.

From near the upper end of the catalytic chamber a pipe 13 leads to a worm 14 of a condenser arranged as in the usual condenser, in a tank adapted to contain water for cooling the worm and causing the vapors supplied to it to be cooled and condensed.

In operation, the mixture of heavy hydrocarbon oil, alcohol and light hydrocarbon oils being placed in the tank 1 and the agitator being operated to mix the ingredients thoroughly, the tank is closed and air supplied under pressure sufficient to feed the mixture to the catalyst, the feed being regulated by a suitable valve in the pipe 9. The mixture passes to the catalytic chamber being delivered at its bottom, where it is subjected to direct action of the heat from the burner 12 which converts the mixture into vapor and this vapor rises through the spaces between the fragments of material with which the chamber is filled and is so acted on by the material that a compound vapor of a permanent character is formed which is adapted for use as the basis for an explosive mixture. Of course for purposes of storage and transportation, this vapor must be reduced to liquid form and this is readily effected by the condenser.

By the use of the agitator, the ingredients from which the liquid is to be made are kept from separating and are carried to the catalyst as a mechanical mixture and are vaporized as a mixture. The effect of the catalyst is to convert this mixture into a stable compound.

I do not herein claim the method carried out by the herein described apparatus since that method is claimed in application Serial No. 302,066, filed June 5, 1919.

Having thus described my invention what I claim is;

1. An apparatus for forming a liquid fuel comprising the combination of a tank having an inlet and an agitator within the tank, a catalytic chamber containing catalytic material, means for heating the latter, a conduit extending from the bottom of the tank to the catalytic chamber, a condenser and a conduit connecting it to the catalytic chamber.

2. An apparatus for making fuel comprising a tank having an opening therein and an agitator, a catalytic chamber containing catalytic material, said chamber being closed, a pipe extending from the bottom of the tank into the catalytic chamber down to near its bottom, means for heating the catalytic chamber, and an exit pipe near the top of the catalytic chamber.

3. An apparatus for forming a liquid fuel comprising the combination of a tank having an inlet and an agitator positioned within the tank, a catalytic chamber containing catalytic material, a conduit extending from the bottom of the tank to the catalytic chamber, a condenser and a conduit connecting it to the catalytic chamber at its top.

4. An apparatus for forming a liquid fuel comprising the combination of a tank having an inlet and an agitator positioned within the tank, a catalytic chamber containing catalytic material, a conduit from the tank to the catalytic chamber, and a condenser arranged to receive vapors from the catalytic chamber.

In testimony whereof I affix my signature this 5th day of June, 1919.

ALBERT HAYES.